(12) United States Patent
Laux et al.

(10) Patent No.: US 9,897,814 B2
(45) Date of Patent: Feb. 20, 2018

(54) DEVICE FOR SAMPLING A LARGE, HIGH-ENERGY LASER BEAM COMBINED WITH A COMPRESSOR COMPRISING A SAMPLE-TAKING DEVICE WITH A SAMPLING DIOPTER

(71) Applicant: THALES, Courbevoie (FR)

(72) Inventors: Sébastien Laux, Palaiseau (FR); Paul Jougla, Paris (FR); François Lureau, Paris (FR)

(73) Assignee: THALES, Courbevoie (FR)

( * ) Notice: Subject to any disclaimer, the term of this patent is extended or adjusted under 35 U.S.C. 154(b) by 143 days.

(21) Appl. No.: 15/100,193

(22) PCT Filed: Dec. 2, 2014

(86) PCT No.: PCT/EP2014/076175
§ 371 (c)(1),
(2) Date: May 27, 2016

(87) PCT Pub. No.: WO2015/082435
PCT Pub. Date: Jun. 11, 2015

(65) Prior Publication Data
US 2017/0003511 A1 Jan. 5, 2017

(30) Foreign Application Priority Data
Dec. 4, 2013 (FR) .................................. 13 02820

(51) Int. Cl.
| | |
|---|---|
| *G02B 27/10* | (2006.01) |
| *H01S 3/00* | (2006.01) |
| *G01J 1/42* | (2006.01) |
| *G01J 1/04* | (2006.01) |
| *G02B 17/00* | (2006.01) |
| *G02B 27/09* | (2006.01) |

(52) U.S. Cl.
CPC .......... *G02B 27/108* (2013.01); *G01J 1/0414* (2013.01); *G01J 1/4257* (2013.01); *G02B 17/008* (2013.01); *G02B 27/0988* (2013.01); *H01S 3/0057* (2013.01); *H01S 3/0071* (2013.01); *G01J 2001/4238* (2013.01)

(58) Field of Classification Search
CPC .... G01J 1/4257; G01J 2001/4238; G01J 1/42; G02B 27/108; H01S 3/0057
USPC .................................................. 250/205, 216
See application file for complete search history.

(56) References Cited

U.S. PATENT DOCUMENTS

| | | | |
|---|---|---|---|
| 5,648,976 A | 7/1997 | Franck et al. | |
| 9,386,675 B2 * | 7/2016 | Suzuki | .................. H05G 2/008 |
| 2011/0268389 A1 | 11/2011 | Miesak | |

FOREIGN PATENT DOCUMENTS

EP        2 654 142 A1    10/2013

* cited by examiner

*Primary Examiner* — Que T Le
(74) *Attorney, Agent, or Firm* — Baker & Hostetler LLP

(57) ABSTRACT

A device for the sampling of a pulsed laser beam of high energy, typically greater than 1 J, and of large size, having a diameter typically greater than 1 cm, combined with a compressor, comprises, upstream of the compressor: a sample-taking device provided with a sampling diopter capable of transmitting T % of the pulsed laser beam, T being greater than 90, and of reflecting (1–T) % of the pulsed laser beam, the reflected beam being called sampled beam, an afocal capable of reducing the size of the sampled beam, the compressor having a determined useful aperture, a device for reinjecting the reduced sampled beam into this useful aperture.

6 Claims, 4 Drawing Sheets

DEVICE FOR SAMPLING A LARGE, HIGH-ENERGY LASER BEAM COMBINED WITH A COMPRESSOR COMPRISING A SAMPLE-TAKING DEVICE WITH A SAMPLING DIOPTER

CROSS-REFERENCE TO RELATED APPLICATIONS

This application is a National Stage of International patent application PCT/EP2014/076175, filed on Dec. 2, 2014, which claims priority to foreign French patent application No. FR 1302820, filed on Dec. 4, 2013, the disclosures of which are incorporated by reference in their entirety.

FIELD OF THE INVENTION

The field of the invention is that of the sampling of a pulsed laser beam of high energy typically greater than 1 J, and of large size, that is to say having a diameter typically greater than 1 cm. The laser pulses concerned typically have a duration less than 1 ps, even of the order of an fs.

BACKGROUND

To perform an analysis representative of a laser beam, a sample of this beam is taken (=the beam is sampled).

It will be recalled that a high-energy and large size pulsed laser beam is obtained by means of a CPA device, CPA being the acronym for "Chirped Pulse Amplifier" that can be seen in FIG. 1 and which comprises, at the input, a stretcher 1 capable of stretching a low-energy laser pulse as a function of the wavelength, linked to an amplifier 2 capable of amplifying the stretched pulse into a high-energy stretched pulse, and linked to a vacuum compressor 3 capable of compressing the stretched and amplified pulse. At the output of the compressor, a high-energy and large size laser pulse is obtained, transmitted in a vacuum for energies greater than 4 TW. In the lasers of TW, even multi-PW, class, the diameter of the laser pulse at the compressor output is of centimetric, even metric, class.

To perform the space-time characterization of such a high-energy system, it is necessary to sample only a very small part of the beam so as not to damage the analysis device, and to reduce its size in order to adapt it to that of this analysis device while retaining its properties.

It is known practice to sample such a beam using:
a so-called "leaky" mirror 32, shown in FIG. 2, placed in the vacuum enclosure 31 of the compressor, but at the output of the compression elements and upstream of an output window 33, and which exhibits a transmission less than 2% to take only a small sample of the compressed main beam,
a reducing afocal 42 corrected of aberrations, situated downstream of the output window of the compressor, and
a device 43 for measuring the reduced sampled beam.

It will be recalled that the upstream downstream direction is that of the propagation of the laser beam.

However, such a sampling device presents a number of drawbacks:
The sampled beam has passed through the leaky mirror 32 before being measured. In the case of a measurement of ultra-short pulse duration, it is necessary to ensure that the optical path traveled by each wavelength (i.e. the spectral phase) which constitutes the pulse is the same on the main beam and the sampled beam. It is also essential to faithfully retain the spectral distribution of the energy (i.e. the spectral intensity). It is therefore essential to compensate this travel over the optical path of the compressed main beam which itself has been reflected and has not therefore passed through the material of the mirror 32. However, such a compensator is difficult to produce given the energy of the main beam at the compressor output. In effect, such a beam would damage any material to be passed through.
Also, the sampled beam undergoes distortions from the leaky mirror, which are also difficult to compensate on the main beam.
Furthermore, a very small transmission (i.e. <2%) requires a very good uniformity of the sample-taking over the entire pupil of the mirror and over the entire spectral band of the mirror. Obtaining transmissions less than 2% with variations less than 0.2% is very difficult to achieve for the leaky mirror manufacturers.

Consequently, there remains, to this day, a need for a system that makes it possible, for these high-energy and large size beams, to perform a sampling without transforming the space-time properties thereof.

SUMMARY OF THE INVENTION

More specifically, the subject of the invention is a device for sampling a high-energy and large diameter pulsed laser beam, intended to be combined with a compressor. It is mainly characterized in that it comprises, upstream of the compressor:
a sample-taking device provided with a sampling diopter capable of transmitting T % of the pulsed laser beam, T being greater than 90, and of reflecting (1−T) % of the pulsed laser beam, the reflected beam being called sampled beam,
an afocal capable of reducing the size of the sampled beam,
the compressor having a determined useful aperture, a device for reinjecting the reduced sampled beam into the useful aperture of the compressor.

In this configuration, the use of a leaky mirror has been replaced by reflection on a diopter. This solution therefore makes it possible to obtain a uniform sampled beam on a wide pupil and representative of the beam to be analyzed. In effect, the sampled beam does not undergo any distortions linked to any non-uniformity in the sample-taking, the sampled beam is a function only of the optical index n of the sample-taking which is identical regardless of the position in the pupil of the beam to be analyzed. It is then possible to use the sampled beam to probe the wide aperture compressor and use a small aperture compensator that can easily be characterized applied to the sampled signal.

According to this configuration, the sampled beam passes through less material than the original beam, contrary to the case presented in the preamble, with a leaky mirror. It is then possible to compensate the passage through material on the optical path of the sampled signal via an easily characterizable compensator.

According to a feature of the invention, the sampling device comprises, on the path of the sampled beam, an optical path compensator, capable of increasing the optical path of this sampled beam.

Another subject of the invention is a device for analyzing a high-energy and large diameter pulsed laser beam from a compressor, which comprises a sampling device as described above and intended to be combined with said compressor, and a device for measuring the sampled and compressed beam.

The invention relates also to an equipment item for laser amplification by pulse compression which comprises a stretcher, an amplifier, a compressor, capable of producing, at the output of the compressor, a high-energy and large diameter pulsed laser beam, characterized in that it comprises an analysis device as described.

BRIEF DESCRIPTION OF THE DRAWINGS

Other features and advantages of the invention will become apparent on reading the following detailed description, given by way of nonlimiting example, and with reference to the attached drawings in which.

From one figure to another, the same elements are identified by the same references.

DETAILED DESCRIPTION

To perform a representative analysis of the high-energy and large size laser pulse obtained at the compressor output, it is necessary for that to ensure that the main beam and the sampled beam undergo the same space-time modifications, along their respective paths.

The problems posed by a sampling device with leaky mirror will first of all be detailed:

The transmission of the leaky mirror or its thickness have to be small to avoid nonlinear effects of SPM (Self Phase Modulation) type during the transmission of the laser in the mirror. It will be recalled that the nonlinear effects depend notably on the peak input power of the pulse and on the material thickness passed through. To keep the nonlinear effects within reasonable bounds as for example an integral B of the transmitted pulse less than 1, the transmission rate of the leaky mirror therefore has to be of the order of 0.1%, which poses the next problem.

By way of illustration, take a high reflectivity, or HR, mirror whose reflectivity is 99.9% at the wavelength $\lambda 1$ and 99.8% at the wavelength $\lambda 2$.

The distortion of the reflected pulse which is the distortion between the two wavelengths is ((99.9−99.8)/(99.9))=0.001. The distortion of the reflected pulse is therefore very small.

In the case of the transmitted pulse, the wavelength $\lambda 1$ is transmitted at 0.2% and the wavelength $\lambda 2$ is transmitted at 0.1%.

For the transmitted pulse, the distortion between the two wavelengths is ((0.2−0.1)/(0.2))=50%. The distortion in this case is therefore very high.

The spectral profile of the transmitted beam (=sampled beam) does not therefore at all resemble the reflected useful beam: it is wider, and can be centered at another wavelength. The temporal measurements will be falsified by these distortions.

In the lasers of TW, even multi-PW, class, where the diameter of the laser pulse in the compressor is of centimetric, even metric, class, the thickness of the leaky mirror has to be of the order of several cm to guarantee a reflected wave front of good quality (without wave front aberrations), whereas this thickness has to be small to limit the nonlinear effects as has been seen above.

Also, the original beam is reflected by the HR mirror, it passes through no material. For its part, the sampled beam passes through the substrate of the mirror. The optical path traveled by the two beams is therefore different, the two beams do not therefore undergo the same space-time distortions.

The solution according to the invention consists in performing the taking of the sample upstream of the compressor. Then, after having reduced the size of the sampled beam to adapt it to the size of the measurement apparatus, it is juxtaposed with the main beam to be compressed by the compressor in the same space-time conditions as the main beam.

Figure 1:
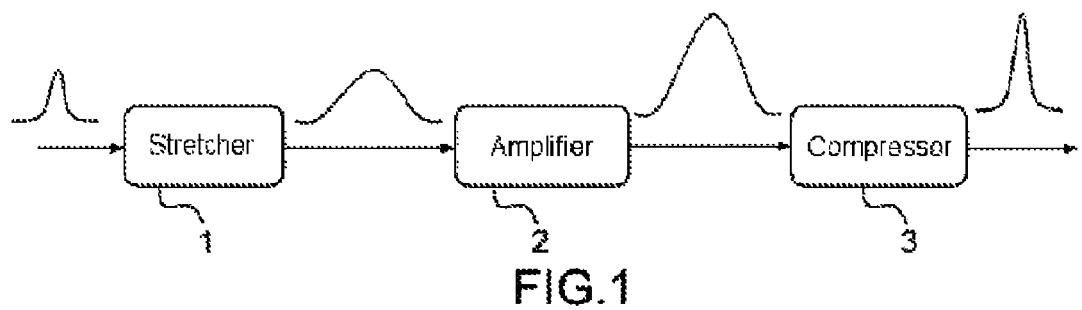
FIG. 1, already described, schematically represents an amplifying chain according to the prior art, FIG. 2, already described, schematically represents a compressor combined with a sampling device according to the prior art, FIG. 3 schematically represents an example of a compressor combined with a sampling device according to the invention, FIG. 4 schematically illustrates examples of imprints of the sampled beam and of the main beam in the useful aperture of a compressor combined with a sampling device according to the invention.
Figure 2:
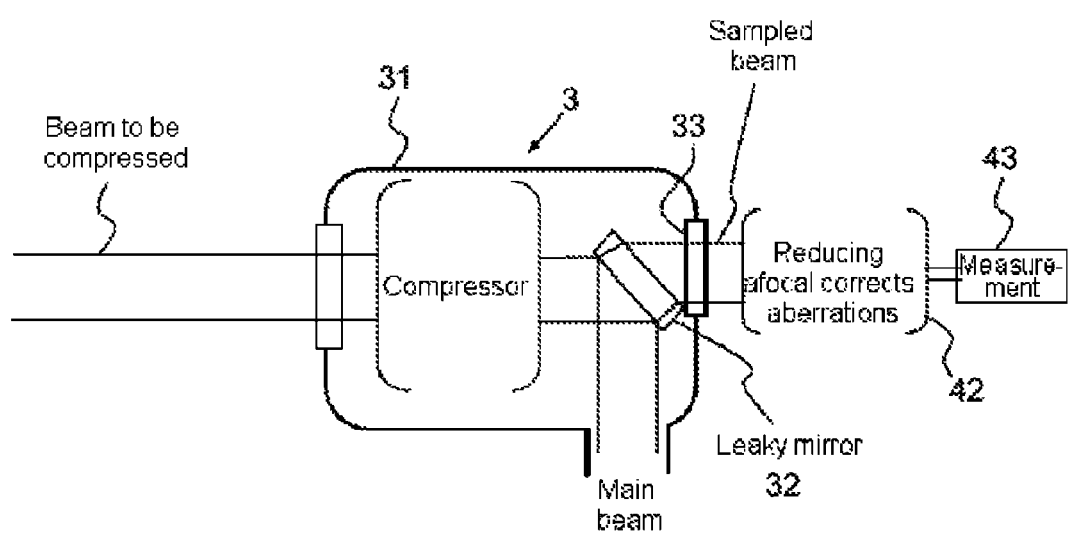
Figure 3:
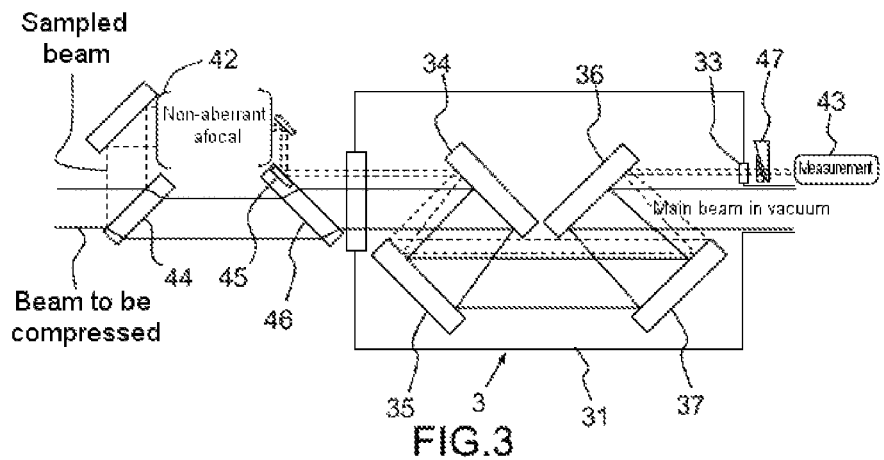

More specifically, the sampling device described in relation to FIG. 3 comprises, upstream of the compressor 3:

A sample-taking device provided by a sampling diopter 44, for example of silica or of BK7, capable of transmitting T % of the pulsed laser beam to be compressed (T>90, even greater than 99), the transmitted beam being called main or reference beam all along its path downstream of this diopter, and of reflecting (1−T) % thereof, the reflected beam being called sampled beam. In passing through the diopter 44, no nonlinear effect occurs because it is the stretched beam which does not yet exhibit the peak power that it will reach at the compressor output.

On the path of the sampled beam:

an afocal 42 capable of reducing the size of the sampled beam, preferably comprising catadioptric optics to retain the properties of the sampled beam;

a device for reinjecting the reduced sampled beam into the useful aperture of the compressor 3. This re-injection device is for example a mirror 45 intended to reflect the reduced sampled beam towards the useful aperture of the compressor 3 by juxtaposing it with the main beam.

Figure 4:
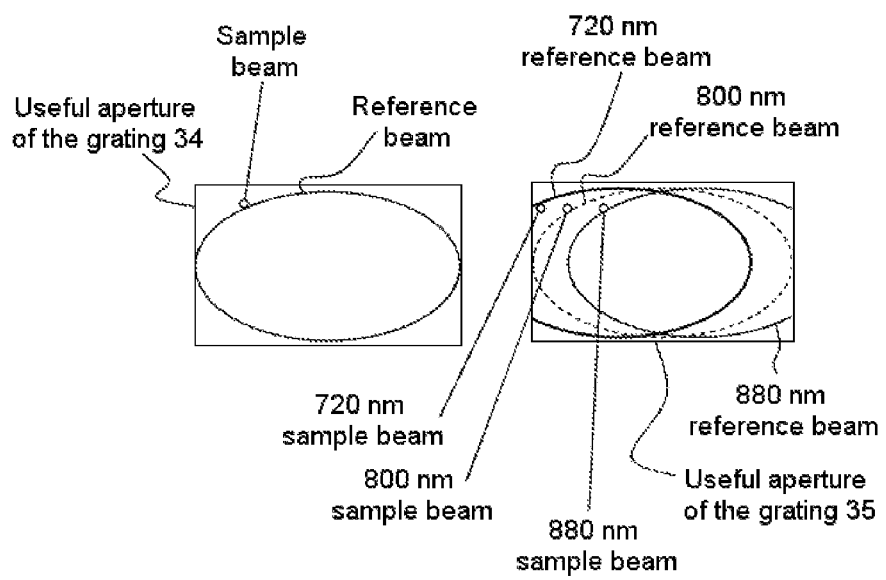

A compressor conventionally comprises one or more dispersive elements such as diopters or reflection dispersive gratings 34, 35, 36, 37, or transmission dispersive gratings, each of these elements having a useful aperture as illustrated in FIG. 4. This figure shows the useful aperture of the grating 34 on the one hand on which arrive the main beam and the reduced sampled beam which have not yet undergone spectral dispersion, and the useful aperture of the grating 35 on the other hand on which arrive the main beam and the reduced sampled beam which have both undergone a first dispersion by the grating 34 (three wavelengths are represented in this figure); it will be noted that the sampled beam and the main beam are juxtaposed in each case. It will be recalled that the useful aperture of the compressor is defined by the part common to the useful apertures of all these dispersive elements.

Optionally, a diopter 46 that is symmetrical to the sampling diopter 44 is placed on the path of the main beam upstream of the compressor. This diopter can comprise a part ensuring the function of the re-injection mirror 45, the other part being intended to transmit the main beam; with the two beams being juxtaposed on this diopter, it is then called recombining diopter 46.

The main beam and the sampled beam have passed through different substrates. The compressed main beam has passed through the sampling diopter 44 and possibly a recombining diopter 46. The compressed sampled beam, for its part, has passed through the output window 33 to the measurement device 43. The sampling device therefore also comprises an optical path compensator 47 for the optical path of each of these two beams to be identical. This is a dispersion compensator placed on the path of the sampled beam downstream of the compressor 3 as shown in the figure (or possibly upstream) in order to obtain the same dispersion on the two beams. This small aperture compensator 47 that can easily be characterized is for example a diopter of adjustable thickness which can consist of two prisms as shown in the figure, and which makes it possible to increase the optical path traveled for each wavelength of the compressed sampled beam (i.e. spectral phase). This is possible because the compressed main beam passes through more material thickness than the compressed sampled beam, contrary to the sampling device with leaky mirror described in the preamble, where it is the sampled beam which passes through the substrate of the mirror.

According to the invention, the sampling is performed in real time.

The applicant has compared the results obtained with a sampling device with leaky mirror and with a sampling device according to the invention.

Figure 5A:
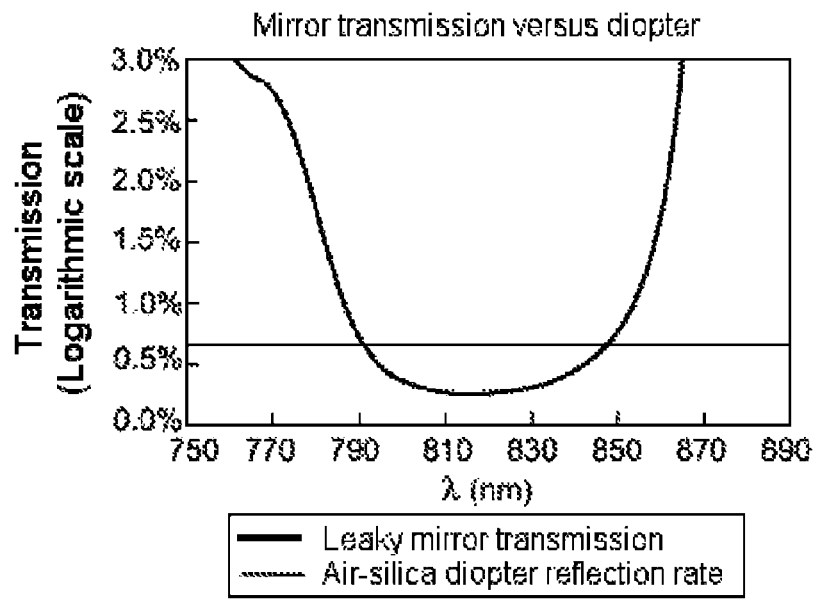
FIGS. 5a and 5b illustrate the comparison between the coefficient of transmission of a leaky mirror with that of reflection on a silica glass diopter (FIG. 5a), and the spectral intensity of a Gaussian spectrum obtained in these two cases (FIG. 5b)
Figure 5B:
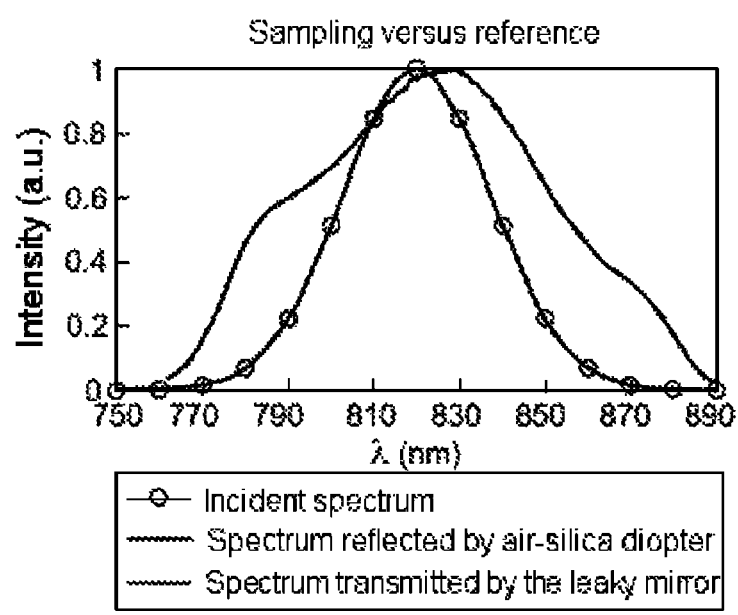

FIG. 5a presents a comparison between the coefficient of transmission of a leaky mirror with that of reflection on a silica glass diopter. The response of the diopter is relatively linear compared to that of the leaky mirror over bands of the order of 100 nm centered at 820 nm, as confirmed by FIG. 5b which presents the spectral intensity of a temporal Gaussian pulse of 25 fs duration, with a width of 40 nm at mid-height centered at 820 nm. It is in fact observed that the reference pulse and the pulse reflected on the diopter are identical, whereas the pulse transmitted via the leaky mirror strongly distorts the signal: the transmitted pulse is not therefore representative of the reflected pulse.

Figure 6:
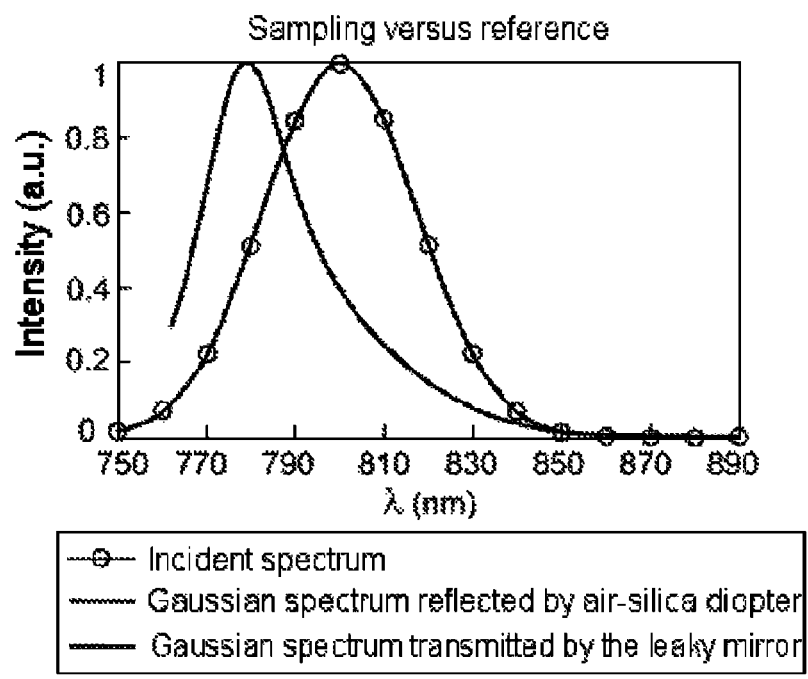
FIG. 6 illustrates the difference in spectral intensity of a Gaussian spectrum after passing through a leaky mirror and after reflection on a diopter, when the pulse is no longer centered on the same wavelength.

Another advantage of the sample-taking on a diopter is the sensitivity to the central wavelength of the signal. FIG. 6 shows the difference in behavior between the leaky mirror and the diopter when the pulse is no longer centered at 820 nm but at 800 nm, which can occur. It can be seen that the intensity of the sample-taking via a diopter is insensitive to the central wavelength contrary to that of the sample-taking by a leaky mirror.

Figure 7:
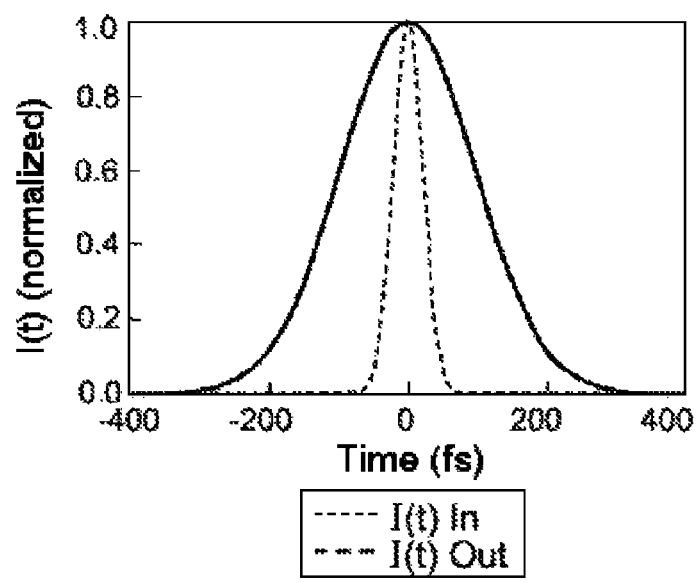
FIG. 7 illustrates the difference in temporal intensity of a temporal Gaussian pulse before and after passing through a material of thickness e (40 mm) at an angle of 45°.

Regarding the difference in optical path (i.e. spectral phase), FIG. 7 illustrates the influence of the passage through a material of thickness e (40 mm) at an angle of 45° on a temporal Gaussian pulse of 25 fs duration and with a width at mid-height of 40 nm centered at 820 nm. It can be observed that the intensity of the sample-taking via the leaky mirror strongly distorts the signal: the transmitted pulse is not therefore representative of the reflected pulse. It will be noted that if this distortion is applied also on the passage of the main beam through the sampling diopter 44, it is then compensated by the compressor set accordingly. The reduced sampled pulse also undergoes a reverse distortion in the duly set compressor; however, the compensator 47 placed on the optical path of the sample beam makes it possible to make up this deviation.

The invention claimed is:

1. A device for sampling a high-energy and large diameter pulsed laser beam, intended to be combined with a compressor, comprising, upstream of the compressor:
   a sample-taking device provided with a sampling diopter capable of transmitting T % of the pulsed laser beam, T being greater than 90, and of reflecting (1−T) % of the pulsed laser beam, the reflected beam being called sampled beam,
   an afocal capable of reducing the size of the sampled beam,
   the compressor having a determined useful aperture, a device for reinjecting the reduced sampled beam into this useful aperture.

2. The sampling device as claimed in claim 1, comprising, on the path of the sampled beam, an optical path compensator (47), capable of increasing the optical path of this sampled beam.

3. The sampling device as claimed in claim 2, wherein the compensator is situated downstream of the compressor.

4. The sampling device as claimed in claim 1, wherein the pulsed laser beam has an energy greater than 1 J and a diameter greater than 1 cm.

5. A device for analyzing a high-energy and large diameter pulsed laser beam from a compressor, which comprises a sampling device as claimed in claim 1, and intended to be combined with said compressor, and a device for measuring the sampled and compressed beam.

6. An equipment item for laser amplification by pulse compression which comprises a stretcher, an amplifier, a compressor, capable of producing, at the output of the compressor, a high-energy and large diameter pulsed laser beam, comprising an analysis device as claimed in claim 5.

* * * * *